April 25, 1961     L. E. WENDLAND     2,981,142
PRISM ART DEVICE

Filed June 16, 1958     2 Sheets-Sheet 1

INVENTOR.
LEO E. WENDLAND
BY
Robinson + Berry
ATTORNEYS

April 25, 1961

L. E. WENDLAND 2,981,142

PRISM ART DEVICE

Filed June 16, 1958

INVENTOR.
LEO E. WENDLAND
BY
Robinson & Berry
ATTORNEYS

United States Patent Office 2,981,142
Patented Apr. 25, 1961

2,981,142
PRISM ART DEVICE

Leo E. Wendland, 4420 Admiral Way, Seattle, Wash.

Filed June 16, 1958, Ser. No. 742,260

1 Claim. (Cl. 88—1)

This invention relates to what will herein be designated as an amusement device. More specifically stated, the present invention resides in the provision of a means for and method of producing changeable, fantastic and beautiful multi-colored scenes in the viewing of illuminated irregular objects through a prism.

It is the principal object of the present invention to provide, as an article of amusement and enjoyment, an apparatus including an enclosure in which selected objects may be placed for viewing under controlled illumination by looking at them through a prism, and including means whereby the viewed objects may be caused to move, and the prism axially rotatably adjusted thus to cause an ever changing view.

It is also an object of the present invention to produce an apparatus of the above stated kind in which said article enclosure is in the form of a booth, and wherein the prism through which the articles are viewed is located in a wall of the housing and provision is made for adjusting its elevation and position to accommodate the viewer.

Still further objects and advantages of the invention reside in the details of construction and combination of its various parts, and in their mode of use, as will hereinafter be fully described.

In accomplishing the above mentioned and other objects of the invention, I have provided the improved details of construction, the preferred forms of which are illustrated in the accompanying drawings, wherein.

Figure 1:
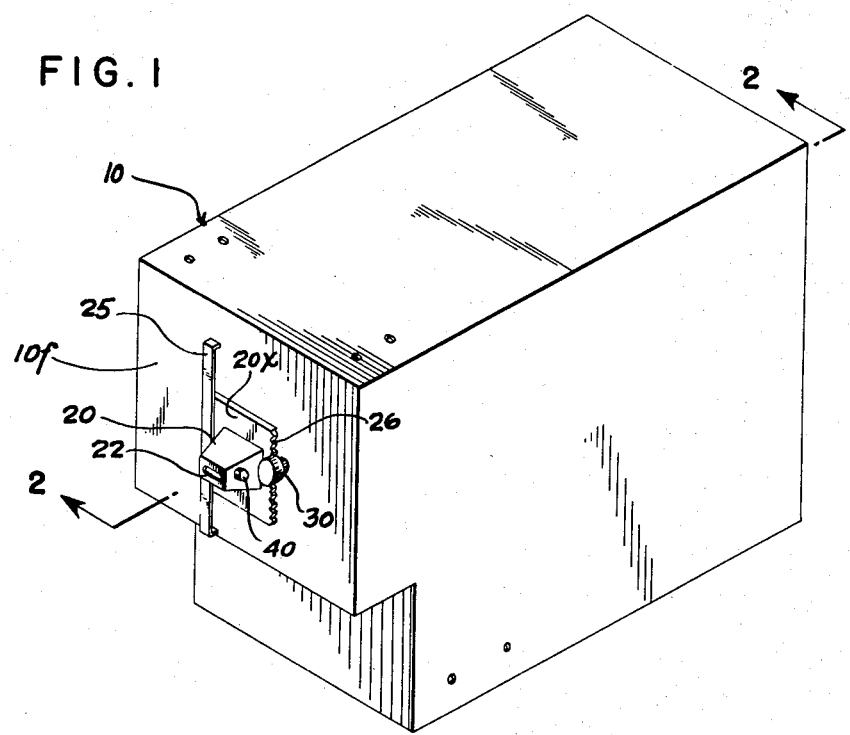
Fig. 1 is an isometric view of an amusement device embodied by the present invention as seen from its front or forward end.

Referring more in detail to the drawings:

The present apparatus may be made in various forms and in various sizes, as may be desired or required, but in any instance it is desirable that it shall include a housing or enclosure in which the object or objects to be viewed can be properly housed and illuminated for viewing, and that the lighting effects shall be substantially controlled. In the present instance such a housing or enclosure is shown in Fig. 1 and it is designated in its entirety by reference numeral 10. This housing is of box-like form and of substantial dimensions. It can be used to best advantage, especially if placed in a public amusement place, if it is approximately six feet high, four feet wide and eight feet long, but a smaller enclosure might be employed with satisfaction especially if designed to serve children or for use in a home.

Figure 2:
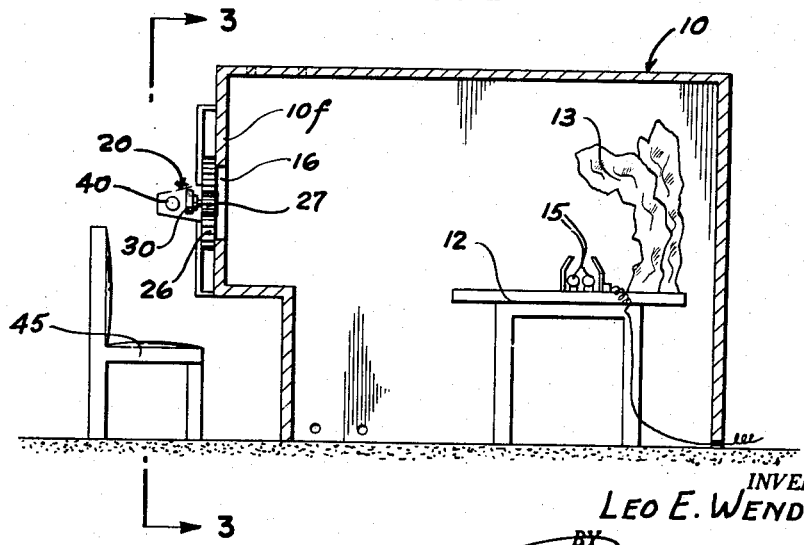
Fig. 2 is a central, longitudinal section of the device, taken in the vertical plane of line 2—2 in Fig. 1.
Figure 3:
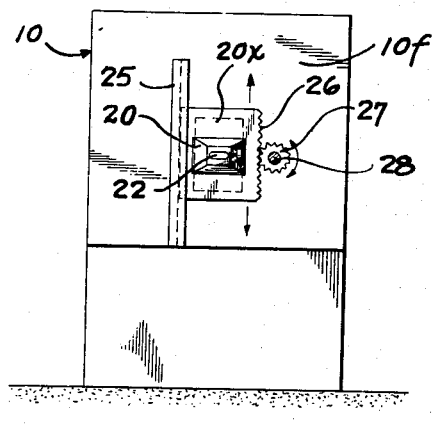
Fig. 3 is a front elevation of the device.

Located in the housing 10, as shown best in Fig. 2, is a table or other form of support 12 on which the object or objects to be viewed may be properly supported for viewing. The object here shown and which is designated by reference numeral 13, represents what may be a crumpled sheet of tinfoil, aluminum or white paper, but which might be any one or more various other objects or materials that are suitable for the present use.

The article to be viewed is illuminated by use of one or more lamps 15. In Fig. 2 the lamps are shown to be located on the table top forwardly of the article but might be located at various other places within the housing, above or below the object, at which the rays of light therefrom will be cast onto the object for reflection to the viewer.

Figure 4:
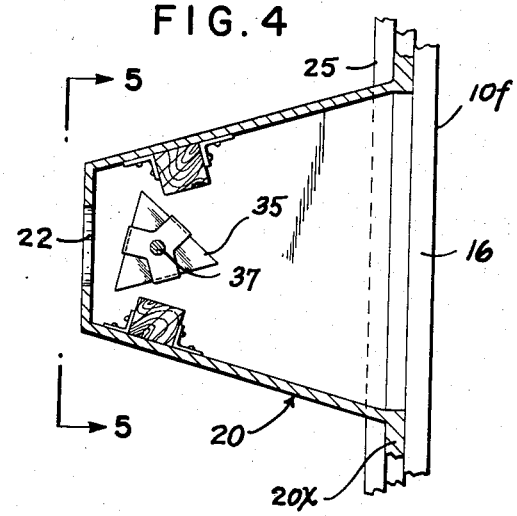
Fig. 4 is an enlarged sectional view of the prism mounting hood as seen on line 4—4 in Fig. 5.

The housing 10 as seen in Fig. 2, has a vertical front end wall portion 10f formed with a centrally located opening 16 of substantial size. Overlying this opening is a small box-like hood 20. This hood is fixed to a base plate 20x that is disposed flatly against the front face of wall 10f and is supported for vertical adjustment over the opening 16 therein. The hood, as seen in Fig. 4, is open at its rear end and is formed in its forward end wall with a horizontal viewing slot 22 through which the person using the device may look to view the illuminated object 13. The hood is held in place by its base plate 20x which along one of its vertical side edge portions is retained for vertical adjustment beneath a guide rail 25 that is fixed to wall 10f and at its opposite side edge is formed with rack teeth 26; this edge being engaged by a small gear wheel 27 that is fixed on a stub shaft 28 rotatably mounted in the front end wall 10f. The shaft 28 has a turning knob 30 fixed thereon, and upon turning the shaft 28 the hood will be adjusted, upwardly or downwardly accordingly.

Figure 5:
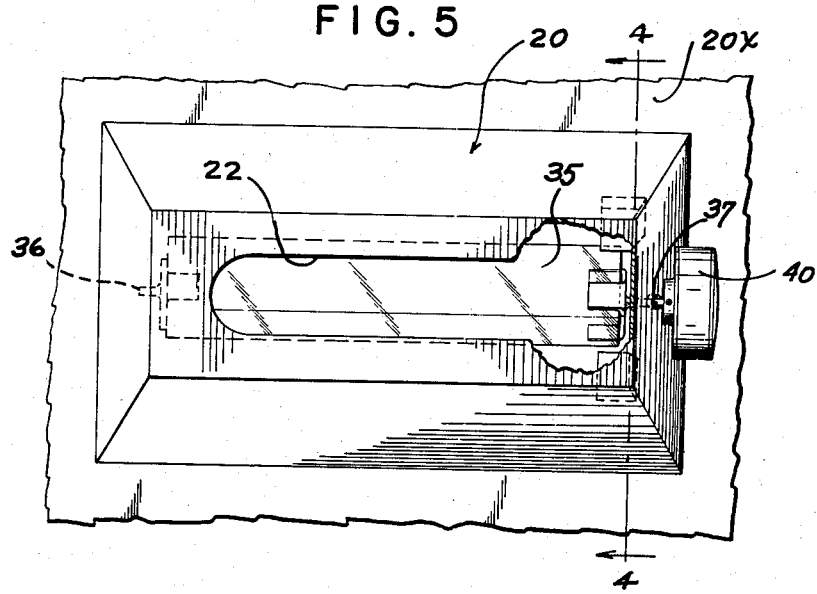
Fig. 5 is an enlarged, front end elevation of the prism mounting hood; a part being broken away for a better showing of the prism mounting and adjusting means.

Contained in the hood, just within and at the level of the viewing slot, is a glass prism 35. This is supported at its opposite ends by trunnions 36 and 37 for axial rotation. These trunnions are rotatable in the sidewalls of the hood as indicated in Fig. 5. The trunnion 37 extends to outside of the hood and is equipped at that end with a turning knob 40, for the rotatable adjustment, by the user of the prism to different viewing positions.

For the convenience of the user of the device, a chair 45 may be located at the front of the housing 10 as seen in Fig. 2. The viewer may then sit in the chair and by use of the knob 30 adjust the position of the hood to eye level. He then looks through the viewing slot 22 and prism 35 at the illuminated object 13. Viewing the scene through the prism brings out all the color effects of the refracted light rays reflected thereto from the viewed object.

When a fluorescent light source consisting of two 40 watt cylindrical lamps, is used, and the object 13 placed back of it for viewing is a strip of aluminum foil extending vertically, the scene as viewed through the prism will appear as the wall of a canyon, all in many glowing colors. If the aluminum foil strip is placed horizontally and the light source placed above it, a fairyland landscape of tiny cone-shaped trees will appear, each glowing with all of the colors of the rainbow.

Should the scene be viewed by the viewer looking upwardly through the prism, the colors will all appear to be going upward. When he views the scene by looking downwardly through the prism, all colors will appear to go downwardly. Thus, underground cave scenes may be created with the representation of stalacites or stalagmites in profusion.

It is to be understood that the created scenes can be varied by varying the position of the light source; its direction and its kind. Also, by varying or changing the articles viewed; their form or position on the support. White tissue paper, crushed and crinkled produces many unusual and unexpected views if viewed while moving, or viewed under varying lights. Spun glass, in various colors, produces cloud effects of ethereal beauty. Slight rotary adjustments of the prism, made while viewing an object results in changing the scene. If the viewed object is placed on a rotating support, then the scene is continuously changing.

It is further anticipated that the support on which the object or article is placed for viewing shall be mounted for rotation, or movement, which can be effected in various ways as, for example, by mounting the table on a central axle rotatably driven by an electric motor.

Aside from the fantastic color effects and assorted designs that are possible by the above described means, the scenes also are given a third dimension, or depth that adds to their beauty.

It is readily apparent that the effects above noted are to be obtained by the viewing of the selected object through a prism, while still or moving, and while illuminated by use of fluorescent, or incandescent lamps of various colors and varying wattage. The size and shape of the housing enclosing the object is immaterial so long as not inconsistent with the invention as above disclosed.

The present device, which I have designed as a "prism art device," as well as being a source of amusement and entertainment, is a means for stimulating a stronger sense of art appreciation in the viewer. As he observes all of the natural beauty of the exotic scenes, he will feel a deeper appreciation of color harmony and realize that here he is viewing a new creation, that is, a new dimension in artistic expression.

What I claim as new is:

A prism art device comprising a light-proof enclosure, said enclosure including an end wall having an opening formed therethrough, a base plate disposed in overlying relationship to said opening, means supporting said base plate on said end wall for vertical adjustment relative to said opening, said base plate including a hood having a viewing slot formed therethrough through which a person may look to view the interior of said enclosure, means supported by said end wall and engaging a portion of said base plate for selectively manually adjusting the vertical position of said base plate and hood, a prism rotatably supported within said hood adjacent said slot and extending substantially parallel to said slot, and means extending outwardly of said hood and connected with said prism for selectively rotatably adjusting the position of said prism to different viewing positions, an article support means disposed within said housing, an article to be viewed supported on said article support means, said article to be viewed including an irregular surface presented toward said viewing slot such that different portions of the viewed surface of the article are disposed at varying distances from said viewing slot, and illuminating means for illuminating the viewed surface of the article within said enclosure whereby a viewer looking through the viewing slot perceives a scene within the enclosure having unusual color effects and assorted designs, the scenes having a depth which adds to their beauty.

References Cited in the file of this patent

UNITED STATES PATENTS

| | | |
|---|---|---|
| 301,562 | Butler | July 8, 1884 |
| 542,804 | Piaget | July 16, 1895 |
| 999,512 | Miele | Aug. 1, 1911 |
| 1,307,598 | Phillips | June 24, 1919 |
| 1,758,801 | Moses | May 13, 1930 |
| 1,895,239 | Venzie | June 24, 1933 |
| 2,061,393 | Christensen | Nov. 17, 1936 |
| 2,321,915 | Higley | June 15, 1943 |
| 2,341,223 | Lillie | Feb. 8, 1944 |
| 2,762,257 | Vacher | Sept. 11, 1956 |